(12) United States Patent
Barrenechea

(10) Patent No.: US 8,037,106 B2
(45) Date of Patent: Oct. 11, 2011

(54) METHOD AND SYSTEM FOR MANAGING INFORMATION TECHNOLOGY DATA

(75) Inventor: Mark J. Barrenechea, Berkeley, CA (US)

(73) Assignee: Computer Associates Think, Inc., Islandia, NY (US)

( * ) Notice: Subject to any disclaimer, the term of this patent is extended or adjusted under 35 U.S.C. 154(b) by 413 days.

(21) Appl. No.: 11/366,146

(22) Filed: Mar. 2, 2006

(65) Prior Publication Data

US 2006/0200477 A1 Sep. 7, 2006

Related U.S. Application Data

(60) Provisional application No. 60/657,976, filed on Mar. 2, 2005.

(51) Int. Cl.
*G06F 7/00* (2006.01)
*G06F 17/30* (2006.01)
*G06F 15/16* (2006.01)

(52) U.S. Cl. .......................... 707/803; 707/736
(58) Field of Classification Search .................. 707/803, 707/736
See application file for complete search history.

(56) References Cited

U.S. PATENT DOCUMENTS

| | | | |
|---|---|---|---|
| 4,774,661 A * | 9/1988 | Kumpati | 707/3 |
| 5,495,610 A * | 2/1996 | Shing et al. | 709/221 |
| 5,634,053 A * | 5/1997 | Noble et al. | 707/4 |
| 5,835,912 A * | 11/1998 | Pet | 707/104.1 |
| 6,236,994 B1 * | 5/2001 | Swartz et al. | 707/6 |
| 6,240,416 B1 * | 5/2001 | Immon et al. | 707/10 |
| 6,917,944 B1 * | 7/2005 | Prasad et al. | 707/803 |
| 6,928,451 B2 * | 8/2005 | Mogi et al. | 707/802 |
| 2002/0019864 A1 * | 2/2002 | Mayer | 709/223 |
| 2002/0038308 A1 * | 3/2002 | Cappi | 707/104.1 |
| 2004/0093408 A1 * | 5/2004 | Hirani et al. | 709/224 |
| 2005/0278342 A1 * | 12/2005 | Abdo et al. | 707/10 |
| 2006/0004875 A1 * | 1/2006 | Baron et al. | 707/200 |

OTHER PUBLICATIONS

TechwebNews, "BMC Debuts Configuration-ManagementDatabase", CMP Media LLC, Jan. 21, 2005 (1 page).*
Denise Dubie, "BMC syncs up mgmt. tools", Network World Inc., vol. 22, Issue 3, Jan. 22, 2005 (1 page).*
eWeek, "BMC Launches Configuration Management Database", Ziff Davis Media Inc., Jan. 25, 2005 (2 pages).*
RDSL, "US—BMC Software launches BMC Atrium CMDB", Responsive Database Services Limited, Jan. 27, 2005 (2 pages).*
R. Elmasri and S. B. Navathe. Fundamentals of Database Systems (third edition). Addison-Wesley, New York, Jun. 2000, Title Pages, Preface and Chapters 1 and 2, pp. iii, iv, vii, viii and 3-39.*

(Continued)

*Primary Examiner* — Greta Robinson
*Assistant Examiner* — Brian E. Weinrich
(74) *Attorney, Agent, or Firm* — Baker Botts L.L.P.

(57) ABSTRACT

A database system for storing information technology (IT) management operational data and a method and apparatus for managing IT data are provided. The database utilizes an integrated database schema. IT operational data is stored into the database using the integrated database schema and the database is accessed by plural applications and/or products using the integrated database schema.

21 Claims, 4 Drawing Sheets

OTHER PUBLICATIONS

R. Elmasri and S. B. Navathe. Fundamentals of Database Systems (third edition). Addison-Wesley, New York, Jun. 2000, Title Pages, Preface and Chapters 1 and 2, pp. iii, iv, vii, viii and 3-39.*

TechwebNews, "*BMC Debuts Configuration-Management Database*", Copyright 2005 CMP Media LLC, (1 page), Jan. 21, 2005.

Dubie, Denise, "*BMC syncs up mgmt. tools*", Copyright 2005 Network World Inc., vol. 22, Issue 3, (1 page), Jan. 22, 2005.

eWeek, "*BMC Launches Configuration Management Database*", Copyright 2005 Ziff Davis Media Inc. (2 pages), Jan. 25, 2005.

RDSL, "*US—BMC Software launches BMC Atrium CMDB*", Copyright 2005 Responsive Database Services Limited, (2 pages), Jan. 27, 2005.

PCT Notification of Transmittal of the International Search Report and the Written Opinion of the International Searching Authority, or the Declaration, for International Application No. PCT/US2006/007445, 9 pages, Jun. 8, 2006.

* cited by examiner

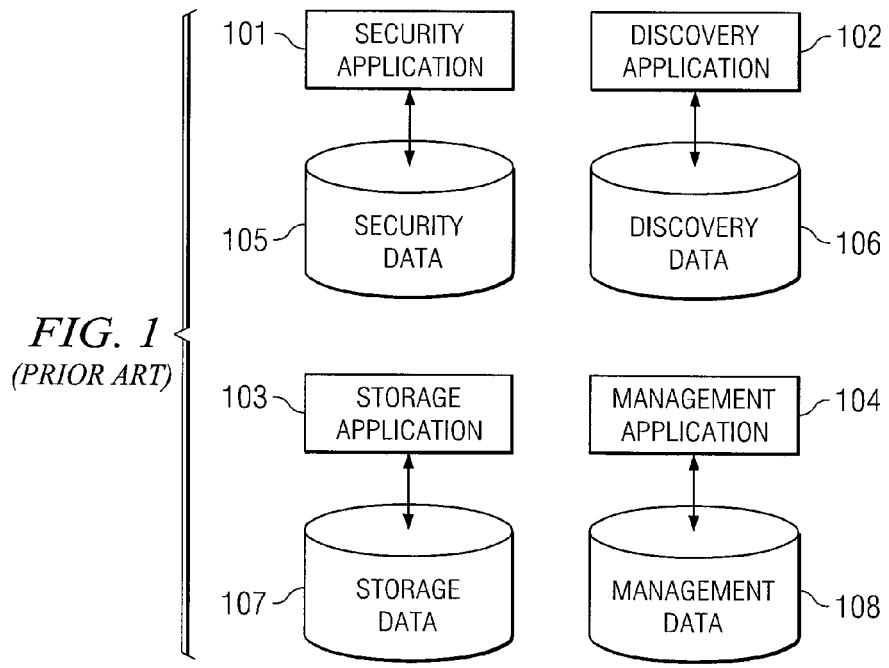
*FIG. 1*
(PRIOR ART)
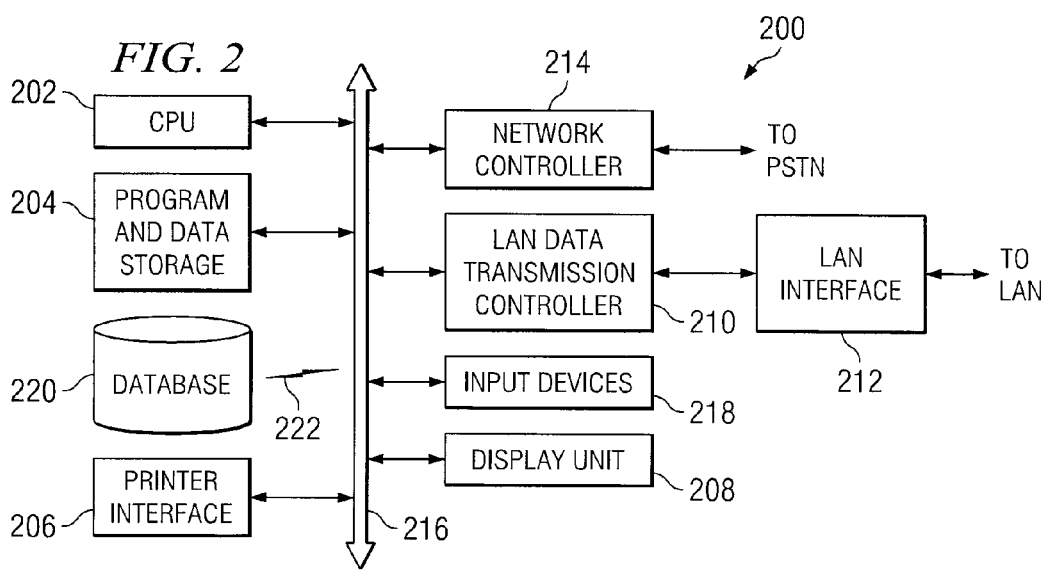

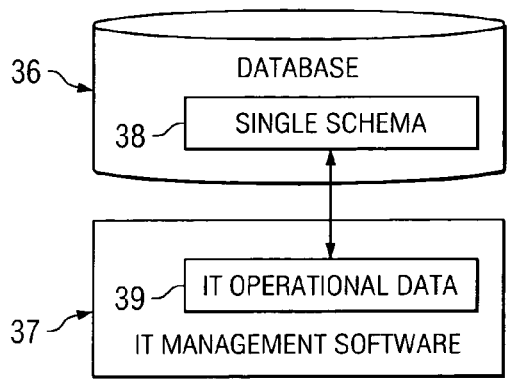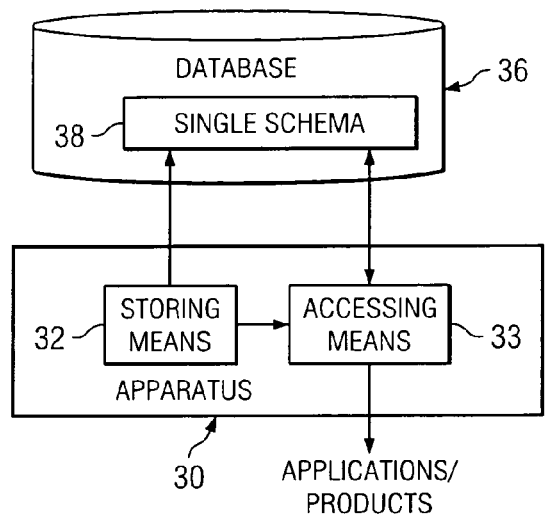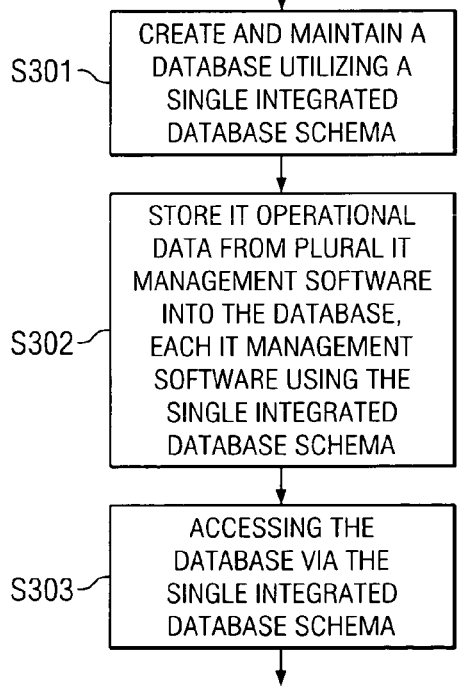

METHOD AND SYSTEM FOR MANAGING INFORMATION TECHNOLOGY DATA

RELATED APPLICATION

This application claims the benefit of U.S. provisional application Ser. No. 60/657,976. filed Mar. 2, 2005. entitled Method and Apparatus for Managing Information Technology Data, which is hereby incorporated by reference.

TECHNICAL FIELD

The present disclosure relates generally to enterprise and information technology management and, more particularly, to a method and system for managing information technology data.

BACKGROUND OF THE INVENTION

Information technology ("IT") is a term associated with all forms of technology used to create, store, exchange and use "information" in its various forms. The growing reliance on IT by enterprises, such as organizations, companies, universities, etc., to manage information makes optimizing the use of IT for managing information increasingly important to the successful and efficient operation of those enterprises.

Information technology (IT) exploded in the late 1990s as competing forces of globalization, competition and demand set up a scenario where businesses could not purchase software and hardware fast enough to keep up with emerging technology.

At the same time, the amount of new data generated worldwide grew by as much as 30% a year—and may have doubled between 1999 and 2002 alone. Email, with as many as 31 billion messages sent daily, created approximately 667,585 terabytes of new information on its own according to some sources. Businesses, facing a deluge of unstructured information and increasingly unable to control it effectively, are experiencing a data explosion that they must now bring under control.

In an effort to harness this deluge of information, management tools are emerging to equip Chief Information Officers ("CIOs") with better solutions and strategies that interoperate more effectively across the organization. IT departments purchased and implemented as much as 50% more management software than application software in 2004. reinforcing the growing need for solutions that deliver results in this new age of management software.

Nearly all aspects of IT are affected by unstructured data, including: corporate networks and the Internet; email; storage; desktops and servers; databases; applications and application servers; wireless; telecommunications; and security. Inflexible PC architectures combined with lots of custom software further frustrate IT efforts.

In many instances, management of IT is a complex task because information technology typically spans a number of domains (for example, storage, security, operations, service, job, server and desktop, applications and databases, life cycle, etc.), and because IT systems can span complex networks with multiple access points and servers, and numerous software components and computing devices. To meet and exceed these demands, an enterprise's IT department needs a way to effectively manage the global information technology infrastructure. Enterprise management application software (or products) allows an enterprise's IT department to manage the enterprise's IT infrastructure, including gathering information about critical resources. The information gathered by the enterprise management software provides IT departments with a view of an enterprise's IT infrastructure.

Conventional enterprise management software allows IT departments to manage their information. Conventional management software often utilizes its own standards, resulting in complex infrastructure administration. Enterprises may find it difficult to administer the software they use to manage their information technology infrastructure because IT data may be in different locations and in different database schemas. In addition, enterprises may also find it difficult to access the data and obtain an accurate view of their IT infrastructure. For example, enterprises often need to utilize multiple application programming interfaces ("APIs") in order to access data from disparate sources.

Conventionally, data can be archived in a data warehouse which stores information from different systems, functions, and locations across an enterprise. However, the information stored in data warehouse is not operational real time data and is typically analytical data (i.e., after-the-fact data used for reporting and business intelligence).

Enterprises often find themselves with IT infrastructures that are over-built, underutilized, ill-secured and not aligned with business goals. Accordingly, there is a need for a reliable and efficient way to manage IT data in order to simplify infrastructure administration and eliminate boundaries between products and/or standards.

SUMMARY OF THE INVENTION

This application describes tools (in the form of methodologies, apparatuses, and systems) for managing information technology data. The tools may be embodied in one or more computer programs stored on a computer readable medium or program storage device and/or transmitted in the form of a computer data signal in one or more segments via a computer network or other transmission medium.

In accordance with one embodiment of the present disclosure, a database system for storing information technology (IT) management operational data for a plurality of IT management software, includes a database system that utilizes a single schema common to a plurality of IT management software systems or products.

A method for managing information technology (IT) data according to an embodiment of the present disclosure, includes creating and maintaining a database utilizing a single integrated database schema, storing IT operational data from plural IT management software into the database, each IT management software using the single integrated database schema, and accessing the database via the single integrated database schema.

An apparatus for managing information technology (IT) data, according to an embodiment of the present disclosure, includes a database utilizing a single integrated database schema, storing means for storing IT operational data into the database using the single integrated database schema, and accessing means configured to allow plural IT management software to access the database utilizing the single integrated database schema.

A computer readable storage medium including computer executable code for managing information technology (IT) data, according to an embodiment of the present disclosure, includes code for creating a database which utilizes a single integrated database schema, code for storing IT operational data into the database using the single integrated database schema, and code for accessing the database utilizing the single integrated database schema.

Technical advantages of particular embodiments of the present invention include a system and method for managing information technology data that incorporates a single, integrated database schema (tables, columns, views, etc.) for the management data stored by multiple or all products within an organization, including both mainframe and distributed.

Further technical advantages of particular embodiments of the present invention include integration having increased visibility into the underlying IT management data, by providing an integrated single database and schema for IT management data. This speeds IT decision-making and helps to reduce costs and increase utilization of existing infrastructure. For example, delivering access to storage, performance, hardware, and software information that is managed in a single database enables fully-informed decisions about hardware, software and storage purchases, provisioning, scheduling, data protection and more.

Further technical advantages of particular embodiments of the present invention include a single schema for the management of IT data that enables the integration of products without additional programming efforts to accomplish the integration. Other methods of integration that do not include a single database schema often require point-to-point programming efforts to access data from disparate sources. This integration of data enables development of new product features because of the availability of data, and shortens development time because there is little need for programming interfaces to make disparate data available.

Further technical advantages of particular embodiments of the present invention include a single management database which means that there is only one database that needs administration, rather than many. This makes the database (and the products that use the database) easier to manage and less expensive. Ad hoc reporting, data mining and any other non-product operations that use the single management database are easier to accomplish because the data is in a single location and not many.

Further technical advantages of particular embodiments of the present invention include a single management database that uses a relational database management system to store its data. This means that the data is available and accessible through an easy to use, well understood, access language (e.g., SQL-Structured Query Language—language that provides an interface to relational database systems). In addition to ease of data access, relational database management systems provide a high degree of reliability, availability, scalability as well as good performance and cluster support.

Further technical advantages of particular embodiments of the present invention include a single database that may serve as a configuration management database as it stores most ITIL related data (incidents, problems, change orders, assets, etc.) as well as a great deal more data. ITIL recommends the use of a configuration management database to store information about the elements that are used to provision and manage IT services.

Other technical advantages are readily apparent to one skilled in the art from the following figures, descriptions, and claims.

BRIEF DESCRIPTION OF THE DRAWINGS

A more complete and thorough understanding of the present embodiments and advantages thereof may be acquired by referring to the following description, taken in conjunction with the accompanying drawings, in which like reference numbers indicate like features, and wherein:

FIG. 1 shows a block diagram illustrating conventional information technology management products and/or applications;

FIG. 2 shows a block diagram of an exemplary computer system capable of implementing the method and system of the present disclosure;

FIG. 3A shows a block diagram illustrating a database system for storing information technology management operational data, according to one embodiment of the disclosure;

FIG. 3B shows a block diagram illustrating an apparatus for managing information technology data, according an embodiment of the present disclosure;

FIG. 3C shows a flow chart illustrating a method for managing information technology data, according to an embodiment of the present disclosure;

DETAILED DESCRIPTION OF THE INVENTION

Figure 4:
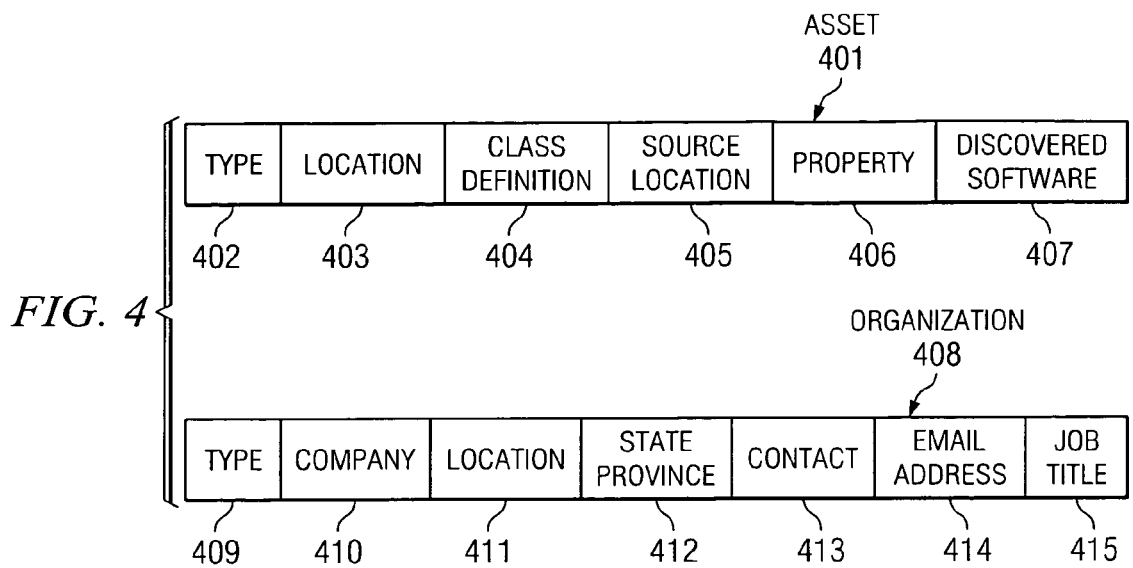
FIG. 4 shows a block diagram illustrating an example of a schema suitable for use in accordance with the teachings of the present disclosure.

The following embodiments are described and/or illustrated to aid in an understanding of the subject matter of this disclosure, but are not intended, and may not be construed, to limit in any way the claims which follow thereafter. Therefore, while specific terminology is employed for the sake of clarity in describing some embodiments, the present disclosure is not intended to be limited to the specific terminology so selected, and it is to be understood that each specific element includes all equivalents which operate in a similar manner.

The 21st-century enterprise must adapt and exist in a constant environment of change. In order to accomplish this goal, management tools need to harmonize infrastructure management, storage management, security management, and application life cycle and data management, etc. This strategy tightens the link between IT and business objectives so companies can anticipate and quickly respond to change.

Improving the management of information-laden content is now recognized as one of the most essential requirements of a new age centered on management. This shift is transforming IT as we know it, and the strategy is central to enhancing productivity in today's service-oriented economy, cutting the cost of operations, and improving the speed, accuracy and quality of decision making in the IT department and across the organization.

IT, once tasked only with overseeing the corporate network and administering PCs, now faces a whole new level and responsibility for managing the enterprise. The role of IT manager as both technology expert and key strategist in the corporate boardroom is a reality. Businesses facing new regulations, more stringent corporate governance and regulatory scrutiny are increasingly relying on IT as the nerve center to best manage information appropriately.

Today's CIOs must focus on managing the resulting complexity, while facing yet another transition to the future.

Because CIOs serve line-of-business executives who worry about cost and flexibility, reducing business risks and time-to-market, they must align their goals with those of their business peers—today and beyond. To get there, these managers should transition to the software industry's powerful new weapon to deliver on the promise of IT and business goals—a tool that facilitates management.

Adapting to change is one of the CIO's top challenges today. Consolidation and standardization remain at the top of the IT agenda. Once solved, CIOs will begin to virtualize and better provision software, hardware and the services required to meet their computing needs, with the ultimate optimization being capacity sourced dynamically and flowing transparently through and across firewalls. This change is compounded with large-scale, inlaying technology shifts: (i) Network, to Gigabit Ethernet and wireless; (ii) Storage, to Petabyte environments and networked storage (SANs); (iii) Cluster of blades, to Linux and disposable hardware; (iv) Regulatory requirements, to Sarbanes-Oxley, Basel II; (v) Security, to an exponential rise in vulnerabilities; (vi) Standards, to ITIL, DCML, SNIA, Global Grid Forum; (vii) Extended enterprise, to Outsourcing, business process hosting, offshoring; and (viii) Open innovation, to one million open source contributors.

As if this is not enough, every major software and hardware provider has introduced new platforms: (i) Microsoft—Longhorn and DSI; (ii) Sun—N1; (iii) HP—Agile computing; (iv) IBM—WebSphere and On-Demand; (v) Oracle—10 g; and (vi) SAP—Netweaver.

These changes, combined with the lack of coordination among industry suppliers and across shifts in fundamental technology, have forced customers to accept a five letter word: "patch."

In 2004. among the top five technology providers alone, there were as many as 75,000 changes released as patches across all software platforms, operating systems, languages and applications. That is approximately one patch every seven minutes.

This rate of change is ever-increasing and complexity continues to grow. On top of that, it all needs to be managed. Beginning at the dawn of the information revolution, we are now entering the age of management software.

"Getting IT right" means making it cost-effective and transparent. This process has been touted under many names—Grid Computing, Adaptive Computing, Just-in-Time Computing, Utility Computing—and some can even see beyond all this (the Mesh). But the prevailing term is On-Demand Computing.

Many major vendors have joined the race to refine this concept and to bring products to market that will meet IT needs: IBM with On-Demand Computing, HP with its Adaptive Infrastructure, Sun with its N1 Architecture, Microsoft with its Dynamic Systems Initiative (DSI), and Oracle with its Grid 10G. Cisco and Veritas are also in the running. The rest of the industry will likely follow.

Commitments to research and development in this arena are estimated to be in the billions of dollars, making it imperative for IT professionals to understand what it's all about. Getting IT right is all about Managing On-Demand Computing$^{SM}$. It's the management component that truly enables the alignment of technology and business needs. That is what drives the vision of on-demand.

The teachings of the present invention help to enable CIOs to focus on cost-effective tools that simplify infrastructure administration and overcome boundaries between products and standards, creating system transparency throughout the enterprise. Offering cross-platform, cross-vendor, cross-application and cross-standard support management tools (e.g., with a single, integrated database schema), companies can scale to connect with legacy systems and also work optimally with future standards-based technologies. This approach allows CIOs to choose a solution that protects their ROI and eliminates single vendor lock-in. It is only with this integrated approach to management that companies will be able to begin to get their IT houses in order.

Adopting real-time infrastructures, IT groups gain network management insights through event-driven architectures. Automating tasks, active network self-managing and self-healing all result in greater efficiency for IT. Patches and potential conflicts can be identified by the system and deployed without user intervention, saving IT time and resources.

Organizations with simplified, real-time infrastructures can begin to increase their utilization of hardware, software and other components. This entails the ability to virtualize and provision across the infrastructure for resource sharing. This automation and provisioning enables companies to utilize their labor resources as well. With the advent of reliable automated environments, organizations will have the ability to scale their businesses without having to hire extensive or additional labor resources.

Ultimately, IT must be aligned with the business. You must have visibility into how IT resources and services support the business so that IT can be managed by business process. You should have the capabilities to build a service-oriented architecture to provide IT as a seamless service to the end user. And there should be full transparency into the IT costs of supporting the various areas of the business so that the organization has the tools to use IT strategically.

It is only with these capabilities that an organization will be able to get its IT house in order so that IT can be run as it should—as an integral and strategic part of the business it supports.

Asset Optimization

To remain agile, companies need to manage their assets across the entire computing infrastructure—from the network to systems to databases to applications—and the entire web infrastructure connecting these layers. If they can't discover those assets, IT cannot manage them. And if they are not managed correctly, security and storage issues can arise.

Despite their best efforts, companies have virtually no idea what IT assets they actually have, who is using them, how much they are spending or how much they are wasting. Nor do they know how IT truly impacts the business. Traditional tools geared toward managing globally distributed IT assets are not always up to the task, handling problems in silos and architecturally not up to the challenge.

An entirely new analytical foundation should be used to handle the multidimensional complexity of today's business needs. As we move toward a more service-oriented architecture model, where network capacity and storage capacity are dynamically linked and managed, CIOs will increasingly need to look for ways to optimize their assets.

Facing the complexity of managing IT, CIOs can no longer view security, storage, enterprise management and network systems management separately. Instead, they should focus on the completeness of all components in a management solution. By adopting a holistic approach, IT groups can get an accurate global view of how technology supports the business. With this link between IT and business objectives, companies can anticipate and quickly respond to new requirements and even create new opportunities.

Asset Optimization: The Management Platform

Assets are becoming increasingly important to CIOs and CEOs, who need to determine how to best manage assets, people, information and devices; add applications throughout the enterprise; secure data; and, ultimately, move into a more service-oriented architecture where capacity, both network and storage, are all likely to be dynamically sourced and managed.

Common data and business processes are at the heart of integrated management software. These span assets, people, performance, business rules, policies, schedules, work flow, service levels and a whole lot more.

The "management platform" consists fundamentally of asset optimization. If you don't know what you have, how can you manage it?

The teachings of the present invention will assist an organization in discovering and inventorying all hardware assets and software assets (supporting Windows, Unix, Linux and open source (Eclipse, Apache, Xerces, OpenLDAP, OpenSSL, OCFS, Open DLM)) throughout the corporate network, in "real time". Once discovered, that information may be stored in a management database (MDB) for central administration. Updates to the MDB can occur at appropriate intervals, specified by corporate management. The assets it records may be governed by policies, owned by people or organizations, and regulated by different service levels.

Further, the teachings of the present invention may help to correlate business processes to individual assets and network traffic. Based on usage, SmartBPV associates from dozens to hundreds of assets with each business process (such as procure-to-pay, email self-service, loan origination), enabling executives to manage down to the element level, the application level or the business-process level.

The teachings of the present invention will assist in determining what software is on what hardware, how many installed instances of a software product verses the number of licenses purchased, what asset is owned by: (i) which employee; (ii) what department; and (iii) what cost center, whether a particular server has ever been backed up (and if so, when), if a particular server is available for job scheduling, and whether there are service tickets against a particular asset.

Once you know what you own, you can: (i) Secure the assets; (ii) Manage their life cycles; (iii) Improve operational efficiencies; (iv) Provide data protection; (v) Set service levels; and/or (vi) Implement financial controls. Benefits of asset optimization allow an organization to: (i) Help ensure software-license compliance; (ii) Manage contracts and leases; (iii) Optimize procurement; (iv) Retire assets as appropriate; (v) Audit vendors; (vi) Manage risk; and/or (vii) Allocate assets cost-effectively.

Operations Management

The teachings of the present invention assist a user to manage the entire IT stack—from desktops to networking, URL to spindle. These are the operational aspects of IT. Operations automation includes desktops and servers, applications and databases, networks and systems, and the work (job optimization) that must execute across the computing environment.

Solutions that target enterprise operations reduce the total cost of ownership (TCO), ease desktop migrations, help ensure high availability of applications and databases, add new capabilities to the environment, enhance network and system performance, and improve reliability. System jobs optimize processing by helping to guarantee work assignments at specific service levels.

Desktop Management

Desktop management systems include backup, software delivery, remote control, virus protection, vulnerability and patch management, and migration of personal settings.

Applications and Databases

CIOs want to manage applications and databases at the business-process level rather than by router number or complex server name. Enterprise infrastructure management enables CIOs to manage processes the way business executives think of them. When they are so managed, operation, in effect, becomes invisible.

The teachings of the present invention may be used to support SAP/NetWeaver, PeopleSoft, Exchange, Oracle 10 g, SQL Server, IBM DB2 and DB2-UDB, WebSphere, BEA WebLogic, and others. These systems should not only perform, but should be available and secure, and should be guaranteed with clear and manageable service levels. They can involve hundreds of devices—from routers, storage, servers, databases and application servers, up to additional systems.

Network and Systems

The Network Operations Center (NOC) is the heart of the data center and all infrastructure events come through the NOC. Event management and correlation engines that incorporate the teachings of the present invention allow network operations to host a single event console overseeing security, network, systems, storage and applications. Because a typical large company can generate millions of events a day, the responsible personnel need automated support to identify which events call for explicit management.

Networks are also expanding into wireless. By 2006, networks may be 20% wireless and 802.11 moves beyond traditional wire-line management. Users will look for secure connections, high quality of service and invisible management. Administrators want perimeter protection, enforcement of policies and WEP key management.

Job Optimization

Large organizations need to manage thousands, or tens of thousands, of work packages per day. Work needs to be assigned dynamically to resources available across all environments, applications, databases and machines. Job optimization in accordance with the teachings of the present invention enables dynamic allocation of work packages to available resources across the full range of platforms and systems in the market. Whether for order entry, enterprise backup or customer batch scripts—and regardless of vendor—such systems enable a user to set and manage service levels for work assignment and completion.

Storage Management

Data volumes are crossing the threshold between terabytes and petabytes, with no sign of slowing down. Exabytes are said to be no more than five years away, according to experts.

Storage management today is being driven by these rising volumes of data and the significant savings that stem from storing data in digital format rather than the original format. Film, video, voice, email, X-rays and documents are all cheaper to store in their non-native formats.

Converging with the data explosion is the plummeting cost of storage. The price of data storage has reached the point that the primary concern for CIOs is now related to labor costs. The industry is also being impacted, as technology is driving the industry from direct-attached storage to storage area networks (SANs), with standard IP-based storage devices looming on the horizon and potentially reducing price further yet.

Data files, applications and databases must be protected. Storage must be discovered, allocated and provisioned for the greatest efficiency. SANs must be designed and deployed. In all cases, information moves through a prescribed and directed life cycle, whether stored in files, in a document management system, in Exchange, in SQL Server or in an Oracle database.

Storage management products that incorporate the teachings of the present invention can be designed to meet these needs comprehensively. Given a complete and integrated storage management system, the focus can change from manual backup to continuous data protection and instant recovery. This comprehensive approach may cut costs as much as 50% compared to "best-of-breed" point offerings, and it arms them to more effectively manage the complex IT maintenance area.

Customers are not just interested in storage for SAN purposes; they also want to have security and network management capabilities for the SAN area, demonstrating integration between storage, security and enterprise management.

Security Management

Enabling a secure infrastructure is perhaps the highest priority and most pressing challenge for CIOs today. The Internet is a global network, with tens of millions of users, many of whom are always on with continuous connections. Firewalls have provided unreliable assurance for IT. A principal problem payload is email.

Complete security is about securing the entire IT stack, from desktops to networks, URL to spindle.

Complete and integrated security, in accordance with the teachings of the present invention, allow a user to address:
 Identity and Access Management
  Enterprise credentials and authorization
  Access control
  Administration of users and groups
 Threat Management
  Vulnerability management
  Secure content management
  Protection against viruses and other malicious software
 Security Information Management
  World-class content team
  Notification and publication services Each and every patch issued has implications on multiple processes—whether it targets new functionality, increases stability or decreases risk. But every patch also represents a potential security event.

Life Cycle Management

Software assets must be managed. What CIO does not have a multiyear application requirements backlog? Professionally managing the life cycle of software assets, whether custom or packaged applications, will improve data reusability, code quality, speed of delivery, end-user acceptance and run time manageability, and it will promote the comprehensiveness with which software needs are met.

Life cycle management includes:
 Business portfolio management
 Business modeling and requirements
 Analysis, modeling and construction
 Change and configuration management
 Testing Service Management Managing operations, storage, security and life cycles can ultimately enable an invisible and efficient IT infrastructure. CIOs are business leaders responsible to their companies for service support and delivery, and for IT financial administration.

Most IT organizations are fiscally managed: yearly IT costs are divided by employee count to arrive at an average that is then allocated to each employee—regardless of the true burden that employees impose on resources.

Imagine how the world would function if other businesses were managed this way; for instance, if an automobile maintenance shop were to bill its average job costs to each of its customers, then every customer would want to own a Porsche, in order to maximize his or her money's worth.

There is a better model in which every executive is charged for what he or she truly uses and for the service level actually required. Detailed and accurate data will enable smart people to make smart business decisions.

Service management software that incorporates the teachings of the present invention can help to provide: (i) Service catalogs; (ii) Service-level management; (iii) Incident and knowledge management; (iv) Functionality for metering, billing and chargeback; and/or (v) Asset financial administration.

The most effective IT organizations rely on visibility of costs and service levels for planning and budgeting as well as for day-to-day IT operations.

Intelligence

Many IT executives and managers cannot answer the most basic questions regarding their global environments. Indeed, these questions can be nearly impossible to answer when management processes are fragmented across many vendors, resulting in fragmented data.

The fragmenting of processes across multiple vendors and databases not only adds cost, but breeds inefficiencies, and obscures or destroys valuable information—information the company needs to leverage in order to make better business decisions.

Harvesting information from the database makes possible more effective business decisions. Sometimes, that information is incomplete; when it is, improving the associated business processes can produce more accurate and comprehensive data. This cycle—imperfect process, imperfect data, improved process, improved data, improved process, improved data—can continue indefinitely, blazing the trail toward world-class infrastructure.

Common Services

Enterprise Infrastructure Management software should be built on a framework of common services: on a common data schema and a single technology stack. These common services can be used to provide a "stack" that is optimized for management. The traditional application technology stack relegates management to an afterthought.

The teachings of the present invention provide a system and method for managing Information Technology data that may include a management database that incorporates a single integrated database schema (set of objects—tables, columns, views, indexes, etc.) for the management of data stored by multiple or all products, including both mainframe and distributed. Particular embodiments of the present invention are illustrated and described in more detail, with reference to FIGS. 1-7.

FIG. 1 is a block diagram illustrating conventional IT management products and/or applications. Security application 101, discovery application 102, storage application 103, and management application 104 have respective databases containing their own data. For example, security application 101 has a database containing security data 105, discovery application 102 has a database containing discovery data 106, storage application 103 has a database containing storage data 107, and management application 104 has a database containing management data 108. These multiple databases may each contain some common (duplicate) data in different formats, which can make managing IT data difficult. When an enterprise having such plural databases has a need for a single database, the conventional approach is to develop custom software for bringing together the data from the disparate databases. Such approaches can be costly and inefficient.

FIG. 2 illustrates an example of a computer system 200 which may implement the tools (for example, in the format of method, apparatus and system) of the present disclosure. The tools of the present disclosure may be implemented via a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet. The tools may be delivered via a client-server or distributed system, or may reside in a standalone configuration.

The computer system 200 can include a central processing unit (CPU) 202, program and data storage devices 204, a printer interface 206, a display unit 208, a (LAN) local area network data transmission controller 210, a LAN interface 212, a network controller 214, an internal bus 216, and one or more input devices 218 (for example, a keyboard, mouse etc.). As shown, the system 200 may be connected to a database 220, via a link 222.

The computer system 200 is illustrated as a particular embodiment of a computer system that may benefit from the teachings of the present invention. The specific embodiments described herein are illustrative, computer system(s) as referred to herein may include(s) individual computers, servers, computing resources, networks, etc., and many variations can be introduced on these embodiments without departing from the spirit of the disclosure or from the scope of the appended claims. In many instances, the tools of this application may be utilized to manage IT infrastructures comprising numerous servers, storage area networks (SANs), mainframes, etc. Therefore, although not shown in FIG. 2, the database 220 may be accessed by and/or coupled with any of the numerous IT components in the infrastructure.

A database system for storing information technology (IT) management operational data, according to one embodiment of the disclosure, will be discussed with reference to FIG. 3A. The database 36 stores IT management operational data 39 for a plurality of IT management software 37. The database 36 utilizes a single schema 38 common to the plurality of IT management software 37. The IT management operational data 39 may include data for any one of the following IT management domains: storage, security, operations, service, job, server and desktop, applications and database, lifecycle, assets and inventory, organizations and people, policies and rules, schedules and workflows, events, metadata, etc. The single schema 38 may be represented by one or more tables, columns and views.

Particular types of IT data that may be managed in accordance with the teachings of the present invention are described in more detail below:

Assets and Inventory

IT management is all about the management, monitoring, maintenance and maximizing the utilization and performance of hardware and software assets and inventory. Assets include software (definitions, instances, agents/managers), hardware (devices, computers, virtualization and storage), licenses (hardware and software), and data (files, volumes, databases, source code, content, documents, reports, etc.). Inventory management discovers hardware, software, and/or other assets in real time and reconciliation processes match discovered inventory to purchases.

Storage

Storage data includes information or metadata about the files, databases and applications that are backed up by products.

Service

Service data includes service level agreements, service catalogs, incidents, problems and change orders. It also includes metering and performance data used for service level management.

Organization/People

Managing the IT infrastructure means administering people (users), the organizations they belong to, their access rights and privileges. It requires defining the locations of people as well as hardware and software.

Policies/Rules

Policy or rules govern the way your IT infrastructure (and/or) business operates. Policies can be defined for all IT management domains (storage, operations, security and life cycle management.)

Schedules/Workflows

Job scheduling and workflow processing help improve the efficiency and capabilities of IT operations. Job scheduling deals with performance of batch processes on a daily, monthly basis while workflow deals with the management and monitoring of business (and/or human related) processes.

Events

Events are things, either expected or unexpected, that happen at given times. In an IT environment an almost unlimited assortment of events can occur at any point in time. Events can signify exceptions, for example that a system is down; or facts, for example, that a job has started or a system has been backed up. Storing event data provides a way to track what happens in an IT environment and to define actions that should occur upon their receipt.

Meta Data

Metadata is "data" about data. Metadata is the core to repository, source code control, and database and model management products. However, meta data is frequently used to store mapping information for a variety of other sources such as user interfaces. Examples include data about storage, data stored and used by development tools, data stored and used by modeling and repositories, and data stored and used to map objects of a table.

Software Settings

Software settings are used to configure and direct the operation of software products. Many products have a variety of settings that can be configured and a common schema is used to define what the settings can be and what they are when products operate.

Software Configurations

Software configurations (e.g., set-up information) define the way software is created or built and include parameters that specify how a software product operates (registries often hold these values). Software configurations often include versions, change history, deltas, and lists of source code files, global variables, and compiler switches used to create one or more software modules. Thus, software configurations include support for application change and life cycle management.

Business Processes

Business processes are the functions of an organization that provide results. Business processes include business functions, processes (manual or automated) that can be implemented using assets, hardware, software, databases, people, schedules and/or workflows. Typically, business processes have associated values, costs and life-cycles that need to be managed. Some examples of business processes/functions are receiving orders, making products, and servicing customers.

An apparatus for managing information technology (IT) data, according to one embodiment of the disclosure, will be discussed with reference to FIG. 3B. The apparatus 30 includes a database 36, storing means 32 and accessing means 33. In addition, schema-creating means may optionally be included for creating a single integrated database schema for a database. The database 36 utilizes a single integrated database schema 38. The storing means 32 stores IT operational data into the database 36 using the single integrated database schema 38. The accessing means 33 accesses the database 36 by utilizing the single integrated database schema 38. It should be apparent that the storing means 32 and accessing means 33 can be respective portions of, or routines in, a computer program which manages IT data (and perhaps performs other functions).

A method for managing information technology (IT) data, will be explained below with reference to FIGS. 3B and 3C. A database 36 is created and maintained utilizing a single integrated database schema 38 (Step S301). The storing means 32 stores IT operational data from plural IT management software into the database 36, each IT management software using the single integrated database schema 38 (Step S302). The accessing means 33 accesses the database 36 via the single integrated database schema 38 (Step S303).

Many enterprises are finding a need to better understand how to manage their information assets, which is becoming increasingly important for determining how to best manage assets, people, information, and devices, adding applications throughout the enterprise, securing data, and transitioning into a more service-oriented architecture where capacity, both network and storage, is becoming dynamically sourced and managed. If enterprises do not know what they have, they cannot manage it. Optimizing information assets solves these problems and enables organizations to implement recommended best practices, delivering a more efficient organization through information technology. For example, asset optimization can be used to help ensure software-license compliance, optimize procurement, retire assets as appropriate, manage contracts and leases, audit vendors, manage risk, allocate assets cost-effectively, etc.

Providing common information technology data and business processes allows for an integrated management software application and/or product. IT data and business processes may span assets, people, performance, business rules, policies, schedules, work flow, service levels, etc. To effectively manage the information technology data, applications and/or products preferably can discover and inventory hardware and software assets through a computer system in real time. Once discovered, asset information may be stored in a management database system for central administration. The assets stored in the database system may be governed by policies, owned by people or organizations, and regulated by different service levels.

Increased visibility into the underlying IT management data for an enterprise may be provided by an integrated single database and schema for IT management data. This may help speed IT decision-making and help to reduce costs and increase utilization of existing infrastructure. For example, delivering access to storage, performance, hardware and software information that is managed in a single database enables fully-informed decisions about hardware, software and storage purchases, provisioning, scheduling, data protection, etc.

A database schema defines and describes the overall structure of database tables that store information. In the simplest case, a database schema may comprise a single table of information. FIG. 4 is a block diagram illustrating an example of such a schema. The schema diagram displays the structure of each record type but does not show the actual record instances. Each record (row) within the asset table 401 might represent a unique asset, with each field (column) representing relevant asset information (type, location, class definition, source location, property, discovered data, etc.). For example, each asset 401 record in a database may include data in a table representing the asset's type 402, location 403, class definition 404, source location 405, property 406, and/or discovered software 407. Each record (row) within the organization table 408 might represent a unique organization, with each field (column) representing relevant organization information (type, company, location, state province, contact, email address, job title, etc.). For example, each organization 408 record in a database may include data in a table representing the organization's type 409, company 410, location 411, state province 412, contact 413, email address 414, and/or job title 415. More complex schema may comprise multiple tables related to one another through a common unique identifier.

The problems encountered by conventional information technology management products and/or applications can be avoided through the method, apparatus and system of the present disclosure, more specifically, through storing much, or all the information technology data used by one or more applications and/or products in an integrated database schema, making the data available in a single location.

Figure 5:
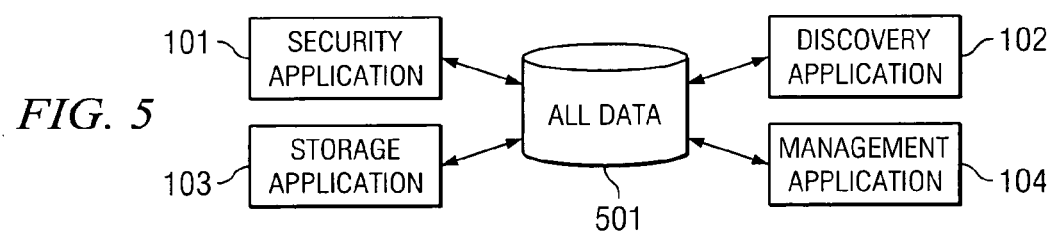
FIG. 5 shows a block diagram illustrating a system of managing information technology data, according to an embodiment of the present disclosure.

FIG. 5 is a block diagram illustrating a system of managing information technology data, according to an embodiment of the present disclosure. Security application 101, discovery application 102, storage application 103, and management application 104 can access a database 501 via the single integrated database schema, where the database contains all of the IT operational data, for example, created and maintained by the applications.

The utilization of a single integrated database schema allows for management optimization and enables enterprises to be more effective and make better decisions with respect to the operation of their information technology infrastructures. The single integrated database schema also enables enterprises to integrate their IT management software without additional programming efforts. For example, other methods of integration that do not include a single database schema require point-to-point programming efforts to access data from disparate sources. The integration of data enables enterprises to easily develop new product features by eliminating the need for programming interfaces that make disparate data available, thereby shortening development time.

The single integrated database schema (through, for example, tables, rows, columns, views, etc.) may be used while allowing access to information technology data in real time (for example, transactional data) for applications and/or products, such as, for example, suites of information technology management applications, in a central database, according to an embodiment of the present disclosure. The database may include all of the information technology data created and maintained by all of the applications and/or products used by an enterprise.

A central database allows management information to be centrally managed by discovering and maintaining a database of the inventory of hardware and software, administering user rights and privileges, defining and managing policies, mapping assets to business processes, etc. Without a central database, the data may be stored in different locations and schemas, making it difficult to integrate and create new features that take advantage of the relationships between the data. For example, without a central database, it may not be easy to determine whether a server located through a discovery process has been backed up, since the data for discovery and storage may be maintained by separate products, in separate databases and on separate servers. A central database provides data in the same single integrated schema making discovery a much more simple process. The central database and single integrated database schema allow enterprises to determine readily through assorted applications and programs how many assets they own, how many assets are in production, how many assets are not managed, what hardware and software is related to what business process, what version of software is being utilized and its patch level, how much total storage is unused, how many applications and databases are unprotected, what the third-party software license risk is, what assets are vulnerable to security threats, what security events are important, etc.

The system, apparatus and method of the present disclosure provide enterprises with asset optimization. Among the many benefits of optimizing assets are the following: ensuring software license compliance, contract and lease management, procurement optimization, asset retirement, vendor auditing and risk management, correct allocation of assets, etc. A single management database means that there is only one database that needs administration, rather than many. This makes the database (and the products that use the database) easier to manage and less expensive.

The database may utilize a relational database management system to store data, making data available and accessible through an easy to use, well understood access language, such as Structured Query Language ("SQL"). This provides the database with ease of data access, a high degree of reliability, availability, scalability, good performance and cluster support, etc.

The single integrated database may be packaged and installed as part of an embedded database installation. Any application and/or product that may utilize the integrated database may verify that the database is installed by using an Application Programming Interface ("API"). Within a version of the schema, according to one embodiment, new fields may be added, but a restriction can be imposed so that they cannot be removed and their data types cannot change. For example, the tables may hold static data, such as machine identifiers, and/or dynamic data, such as point-in-time (snapshot) data, real time data (always current), and/or historical (log or trend) data. Static data may be loaded once when the database is created. Dynamic data may be loaded when the application and/or product using the data executes with or without updates. Some tables may be updated by more than one application and/or product. Indeed the single integrated database schema facilitates access by multiple applications and products.

The single integrated database schema ties together data from assorted information technology management disciplines. The schema can be extended to store information technology management data from any software used to manage information technology infrastructure. According to an embodiment of the present disclosure, new application and/or product features can be easily provided because the data is provided in a single integrated database schema and is readily available. For example, a feature allowing users to determine through a discovery process whether a server was backed up on the previous day can be easily implemented because data from respective servers are readily available through the same integrated schema, as opposed to disparate schemas located on different servers where tables have columns with different names.

The single integrated database schema may include data for any of the following information technology management domains: operations, storage, security, service, job, server and desktop, applications and databases and/or life cycle, etc.

Operations management may include information technology data for or from any of the following: servers and desktops, applications and databases, networks and systems, and job optimizations. The system, apparatus and method of the present disclosure may be used to facilitate operations management by easing desktop migrations, helping ensure high availability of applications and databases, enhancing network and system performance, and improving reliability through job optimization.

Storage management may include operational data for or from any of the following IT features: data protection, storage resource management, storage area network optimization, and information life cycle management. The system, apparatus and method of the present disclosure facilitate storage management by providing continuous data protection and instant recovery.

Security management may include operational data for or from any of the following IT features: identity and access management, threat management, and security information management. The system, apparatus and method of the present disclosure facilitates identity and access management, threat management and security information management by providing complete and integrated security. It centralizes data for access control, enterprise credential authorization, vulnerability management, secure content management, protection against viruses and other malicious software, notification and publication services, etc.

Life cycle management may include operational data for any of the following IT features: application assets and life cycle maintenance. The system, apparatus and method of the present disclosure allows the life cycle of software assets to be managed efficiently, improving data reusability, code quality, speed of delivery, end-user acceptance and run-time manageability.

Figure 6:
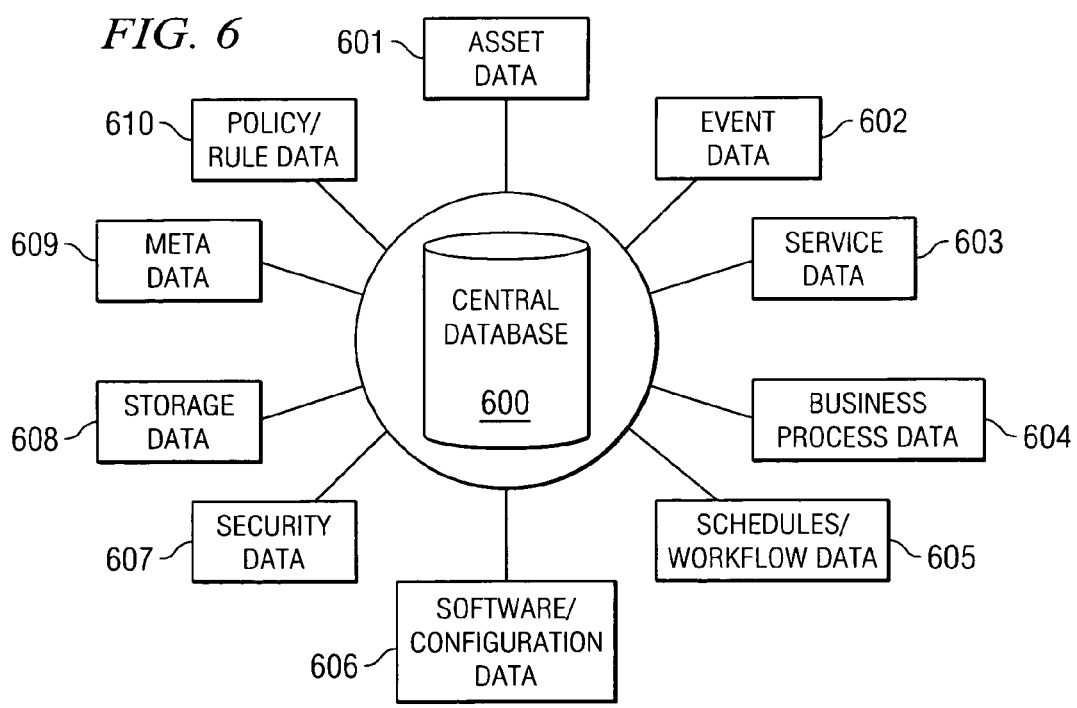
FIG. 6 shows a block diagram illustrating assorted examples of types of operational and analytical data which may be coupled through an integrated database schema, according to an embodiment of the present disclosure.

FIG. 6 is a block diagram illustrating assorted exemplary types of operational and analytical data which may be coupled through a single integrated database schema, according to an embodiment of the present disclosure. Each box in the diagram represents categories of data that can represent numerous of individual data entities. The following types of data may be included in a central database 600: asset data 601, event data 602, service data 603, business process data 604, schedules/workflow data 605, software/configuration data 606, security data 607, storage data 608, meta data 609, and/or policy/rule data 610. The asset data 601 may include information about hardware (for example, devices, computers virtualization, storage, etc.), software (for example, definitions, instances, agents/managers, etc.), networks, data (for example, files, content, volumes, databases, source code, etc.), hardware and software licenses, etc. The event data 602 may include data that represents events that occur when expected or unexpected events take place in the information technology infrastructure, such as triggers and/or alerts, etc. The service data 603 may include data related to services, such as service catalogs, service level agreements, service offerings, incidents/requests, escalations, change orders, compliance, etc. The business process data 604 may include information about business functions as they relate to both hardware and software that have costs, values and life cycles, etc. The schedule/workflow data 605 may include data that define any of the following: processes that are to be performed (for example, jobs, tasks, etc.), when processes are to be performed (for example, schedules, calendars, etc), and/or status information relating to the processes (for example, workflows). The software configuration data 606 may include data that may be used to manage and track the building of source code into deployable modules, such as versions, change history, deltas, list of source code files, global variables, compiler switches, etc. The security data 607 may include data related to enforcing the security of organizations, users, hardware and/or software, etc. The storage data 608 may include data about storage. The meta data 609 may include data about data, such as data about storage, data stored and used by development tools, data stored and used by modeling and repositories, data stored and used to map objects to tables, etc. The policy/rule data 610 may include data used to enforce rules for management (for example, license management, enterprise management, and/or storage management), security, business, general purpose, and/or configuration, etc.

According to an embodiment of the present disclosure, additional tables may be added to the integrated database. According to another embodiment of the present disclosure, one or more instances of the integrated database can be installed on a system.

Thus, in accordance with the teachings of the present invention, the information technology data may be accessed from the central management database ("MDB") by applications and/or products through an easy to use, well understood access language, such as, Structured Query Language (SQL). The central database may be linked to plural applications and/or products by using plural common services. The common services may include a portal, a report writer, a business process manager, a service-oriented architecture, an application server, and/or one or more agents. The service-oriented architecture may be built on web services and may place the workload where resources are available.

The MDB enables product integration, and through this allows the creating of intelligence focused applications. With all of the data in a single database schema, answers to questions about the operation of the IT infrastructure are available. As an example, the MDB stores information about hardware and software assets, storage and job scheduling. Having this data available in the same database, with common asset identifiers enables answering the following types of questions about an organizations IT infrastructure: (i) How many assets do we have? (ii) Is there a license exposure / audit risk? (iii) What databases are backed up or have not been backed up? (iv) Do we have underutilized storage? (v) Do we have a consolidation opportunity? (vi) What assets are vulnerable? (vii) Do we have risks for particular business processes? (viii) Which servers (and who did we buy them from) have the most incidents? (ix) Do we have servers with capacity and applications required for job execution via the scheduler?

Figure 7:
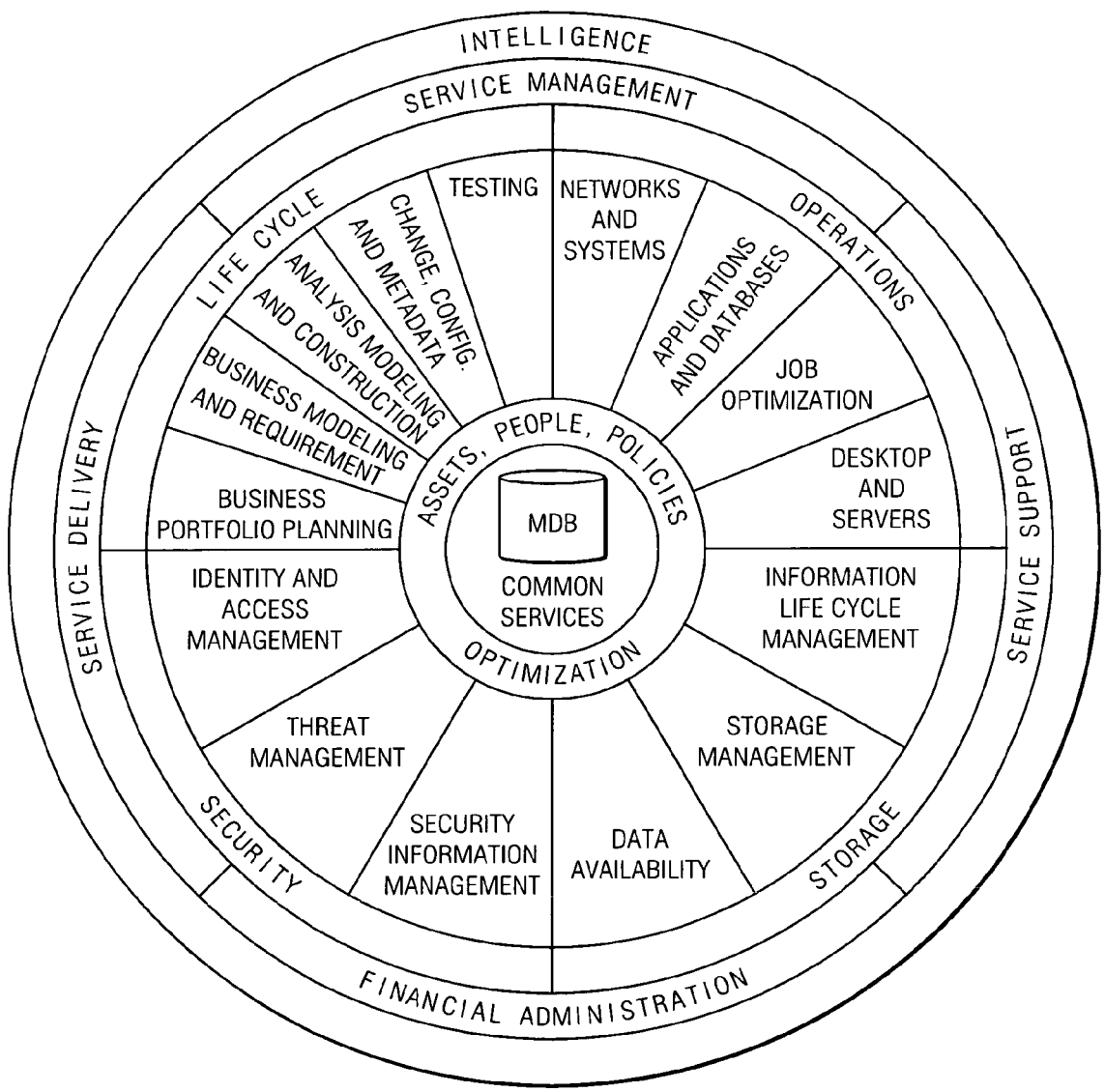
FIG. 7 is a graphical representation of an enterprise infrastructure management system and method that incorporates teachings of the present disclosure.

FIG. 7 illustrates a graphical representation of an enterprise infrastructure management method and system that incorporates aspects of the present invention. This (physical and/or logical) structure allows a user to automate IT operations, storage, security, life-cycle and service management.

Schema

The MDB provides a single schema for management data. The schema includes operational/transaction data as well as analytical data used for intelligence and data mining. Depending on an organizations business needs and structure they can chose to run their operation using a single MDB or multiple. However, the schema may remain the same.

The database of the present disclosure may be deployed by using a single repository for the entire managed environment or it may be deployed in multiple instances in a hub and spoke model. This decision is environment specific and may be determined during the architecture phase. For example, in large environments where real time and states information needs to be maintained out at the network edges, often multiple databases may be deployed.

The Hub and spoke deployment allows customers to deploy a module at a time, by functional suite, by integrated business flow or by logical functional segment. Because the database definitions are consistent across all nodes in the environment, distributed queries can easily span databases. In addition, common services may be provided to enable data movement and migration into the open and relational data structures and APIs of the MDB. Thus, products and technologies may be delivered that collect any distributed information into a central MDB, in batch mode, for reporting and intelligent decision making.

For customers with extremely large environments that have multiple repositories due to organizational, scaling or geographic reasons, existing product specific synchronization technologies may be used.

Data replication can also be used to provide a federated approach. Management information can be segmented and implemented by function/geography and organization, each with its own MDB. Data from each MDB is replicated to a central database server that provides a single integrated view of the companies IT infrastructure. Management information in each MDB would be close to the point of management. Data from different databases (MDBs) may be accessed as if it were one database.

The MDB greatly simplifies efforts to deploy products in a large environment through the use of a single schema, rationalization of the description of an asset, increased integration between the desktop management products and the introduction of intelligence products that collect all the information necessary to present an enterprise view.

The MDB provides a single schema definition that may be used by many, or every product. The MDB also provides the sharing of a standard definition of assets, users, access information and other items across products. This provides the basis for brand new solutions such as the intelligence products that can now leverage all the information necessary to present an enterprise view of management information MDB Schema Management information may be written directly to the MDB by products. Connectors may be provided that move data from other management platforms into the MDB. In addition, there are other options for integrating external management information into the MDB:

XML import/export utilities can move data into the MDB or out. Customer's who can get management data from an external management system into an XML document can use XML transforms to convert from the originating format into the import format to load the MDB. (Note that this may require a data mapping exercise that maps the external data to one or more table sin the MDB.) Industry standard tools, such as Xerces and Xalan can be used to perform the XML transformations. Extracting data from the MDB is a similar process.

A data transformer program may provide direct SQL access to all leading databases, and may include the ability to accept and create files, and transform XML data to/from relational database systems.

Custom programs may be written for this purpose.

The Common Information Model Standard (CIM) provides an object model for describing a number of types of management information. The MDB provides a complete definition for all management information across operations, storage, security, life cycle and service management disciplines. CIM interfaces to the MDB may be supported as well as any other major industry standards. The MDB may provide data beyond that covered by CIM and include richer and more robust relationships.

Many companies today still use a discovery process to populate much of the information about IT assets. The MDB provides a single consistent repository for IT Assets. For example, if a change process creates an asset for a new server, then any product will be able to share the definition of that server. So when the server comes online, a manager may "discover" the server and extend the asset definition with current information about any vulnerabilities that might exist on that server.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for managing information technology (IT) data, comprising:
    creating and maintaining a database utilizing a single integrated database schema;
    using the single integrated database schema to configure at least one configurable software setting, for each of a plurality of IT management software products associated with a plurality of platforms, each of the at least one configurable software settings comprising a parameter that specifies how a particular one of the plurality of IT management software products operates, and wherein configuring the parameter causes each of the plurality of IT management software products to direct the operation of the plurality of IT management software products associated with the plurality of platforms in accordance with the single integrated database schema such that IT operational data is stored in the database using the single integrated database schema when created by each of the plurality of IT management software products;
    upon creation of the IT operational data by each of the plurality of IT management software products, storing the IT operational data from the plurality of IT management software products associated with the plurality of platforms in the database, wherein the database is maintained in a single location and stores the IT operational data for the plurality of IT management software products in the single location, each piece of IT management software products associated with the plurality of platforms using the single integrated database schema common to the plurality of IT management software; and
    accessing the database via the single integrated database schema common to a plurality of IT management software products associated with the plurality of platforms.

2. The method of claim 1, wherein the stored IT operational data comprises one or more of asset data, event data, service data, business process data, schedule and workflow data, software configuration data, security data, storage data, meta data and policy data.

3. The method of claim 1, wherein the stored IT operational data comprises data created and maintained by the plurality of IT management software products offered by a plurality of vendors.

4. The method of claim 1, wherein the database is accessed by the plurality of IT management software products offered by a plurality of vendors.

5. The method of claim 1, wherein the single integrated database schema comprises one or more tables.

6. An apparatus for managing information technology (IT) data, comprising:
    a plurality of IT management software products associated with a plurality of platforms for accessing and storing IT operational data, each of the plurality of IT management software products associated with the plurality of platforms including at least one configurable software setting directing the operation of the plurality of IT management software products associated with the plurality of platforms, each of the at least one configurable software settings comprising a parameter that specifies how a particular one of the plurality of IT management software products operates, and wherein configuring the parameter causes each of the plurality of IT management software products to operate in accordance with a single integrated database schema such that the IT operational data is stored using the single integrated database schema when created by each of the plurality of IT management software products;
    a database utilizing the single integrated database schema that is common to the plurality of IT management software products associated with the plurality of platforms, wherein the database is maintained in a single location and stores the IT operational data for the plurality of IT management software products in the single location; and
    a central processing unit in communication with the database, the central processing unit comprising:
    a storing means for storing IT operational data into the database using the single integrated database schema that is common to the plurality of IT management software products associated with the plurality of platforms, the IT operational data stored in the database when created by each of the plurality of IT management software products; and
    an accessing means allowing the plurality of IT management software products associated with the plurality of platforms to access the database utilizing the single integrated database schema that is common to the plurality of IT management software products associated with the plurality of platforms.

7. The apparatus of claim 6, wherein the IT operational data stored by said storing means into the database using the single integrated schema comprises one or more of asset data, event data, service data, business process data, schedule and workflow data, software configuration data, security data, storage data, meta data and policy data.

8. The apparatus of claim 6, wherein the IT operational data stored by said storing means into the database using the single integrated schema comprises data created and maintained by the plurality of IT management software products, the plurality of IT management software products offered by a plurality of vendors.

9. The apparatus of claim 6, wherein the database is accessed by the plurality of IT management software products, the plurality of IT management software products offered by a plurality of vendors.

10. The apparatus of claim 6, wherein the single integrated database schema comprises one or more tables.

11. A computer readable storage medium including computer executable code for managing information technology (IT) data, comprising:
    code for creating a database which utilizes a single integrated database schema;

code for using the single integrated database schema to configure at least one software setting, for each of a plurality of IT management software products associated with a plurality of platforms, each of the at least one configurable software settings comprising a parameter that specifies how a particular one of the plurality of IT management software products operates, and wherein configuring the parameter causes each of the plurality of IT management software products to direct the operation of the plurality of IT management software products associated with the plurality of platforms in accordance with the single integrated database schema such that IT operational data is stored in the database using the single integrated database schema upon creation by each of the plurality of IT management software products;

code for storing the IT operational data in the database using the single integrated database schema that is common to the plurality of IT management software products associated with the plurality of platforms, the database maintained in a single location and storing the IT operational data for the plurality of IT management software products in the single location, the IT operational data stored in the database when created by each of the plurality of IT management software products; and code for accessing the database utilizing the single integrated database schema that is common to the plurality of IT management software products associated with the plurality of platforms.

12. The computer readable storage medium of claim 11, wherein the stored IT operational data comprises one or more of asset data, event data, service data, business process data, schedule and workflow data, software configuration data, security data, storage data, meta data and policy data.

13. The computer readable storage medium of claim 11, wherein the database is accessed by the plurality of IT management software products, the plurality of IT management software products offered by a plurality of vendors.

14. The computer readable storage medium of claim 11, wherein the single integrated database schema comprises one or more tables.

15. A computer readable storage medium including computer executable code for managing information technology (IT) data, comprising:

code for creating a database which utilizes a single integrated database schema;

code for using the single integrated database schema to configure at least one configurable software setting, for each of a plurality of IT management software products associated with a plurality of platforms, each of the at least one configurable software settings comprising a parameter that specifies how a particular one of the plurality of IT management software products operates, and wherein configuring the parameter causes each of the plurality of IT management software products to direct the operation of the plurality of IT management software products associated with the plurality of platforms in accordance with the single integrated database schema such that IT operational data is stored in the database using the single integrated database schema when created by each of the plurality of IT management software products;

code for storing the IT operational data in the database using the single integrated database schema that is common to the plurality of IT management software products associated with the plurality of platforms, the database maintained in a single location and storing the IT operational data for the plurality of IT management software products in the single location, the IT operational data stored in the database when created by each of the plurality of IT management software products; and code for accessing the database utilizing the single integrated database schema; and wherein the stored IT operational data comprises data created and maintained by the plurality of IT management software products associated with the plurality of platforms.

16. A system comprising:

a database utilizing a single integrated database schema; and a central processing unit in communication with the database, the central processing unit operating to:

maintain the database utilizing the single integrated database schema;

use the single integrated database schema to configure at least one configurable software setting, for each of a plurality of IT management software applications associated with a plurality of platforms, each of the at least one configurable software settings comprising a parameter that specifies how a particular one of the plurality of IT management software products operates, and wherein configuring the parameter causes each of the plurality of IT management software products to direct the operation of the plurality of IT management software products associated with the plurality of platforms in accordance with the single integrated database schema such that IT operational data is stored in the database using the single integrated database schema when created by each of the plurality of IT management software products;

communicate with the plurality of information technology (IT) management software applications associated with the plurality of platforms;

upon creation of the IT operational data by each of the plurality of IT management software products, receive the IT operational data from the plurality of IT management software applications associated with the plurality of platforms; and access and store the IT operational data from the plurality of IT management software applications associated with the plurality of platforms in the database using the single integrated database schema that is common to the plurality of IT management software applications associated with the plurality of platforms, the database being maintained in a single location and storing the IT operational data for the plurality of IT management software products in the single location.

17. The system of claim 16, wherein the IT management operational data includes data for two or more of the following domains: storage; security; operations; service; job; server and desktop; applications and databases; lifecycle; assets and inventory; organizations and people; policies and rules; schedules and workflows; events; and metadata.

18. The system of claim 16, wherein the single schema is represented by one or more of tables, columns and views.

19. The system of claim 16, wherein the database utilizes a relational database management system to store data.

20. A program storage device readable by a computer, the program storage device embodying a program of instructions executable by the computer to:

create and maintain a database utilizing a single integrated database schema;

use the single integrated database schema to configure at least one configurable software setting, for each of a plurality of IT management software products associated with a plurality of platforms, each of the at least one configurable software settings comprising a parameter that specifies how a particular one of the plurality of IT management software products operates, and wherein configuring the parameter causes each of the plurality of IT management software products to direct the operation of the plurality of IT management software products associated with the plurality of platforms in accordance with the single integrated database schema such that IT operational data is stored in the database using the single integrated database schema when created by each of the plurality of IT management software products;

upon creation of the IT operational data by each of the plurality of IT management software products, store IT operational data from the plurality of IT management software products associated with the plurality of platforms in the database, the database maintained in a single location and storing the IT operational data for the plurality of IT management software products in the single location, each piece of IT management software using the single integrated database schema that is common to the plurality of IT management software products associated with the plurality of platforms; and access the database via the single integrated database schema that is common to the plurality of IT management software products associated with the plurality of platforms.

21. A computer system comprising:

a processor; and a program storage device readable by the computer system, the program storage device tangibly embodying a program of instructions executable by the processor to:

create and maintain a database utilizing a single integrated database schema;

use the single integrated database schema to configure at least one configurable software setting, for each of a plurality of IT management software products associated with a plurality of platforms, each of the at least one configurable software settings comprising a parameter that specifies how a particular one of the plurality of IT management software products operates, and wherein configuring the parameter causes each of the plurality of IT management software products to direct the operation of the plurality of IT management software products associated with the plurality of platforms in accordance with the single integrated database schema such that IT operational data is stored in the database using the single integrated database schema when created by each of the plurality of IT management software products;

upon creation of the IT operational data by each of the plurality of IT management software products, store IT operational data from plural IT management software products associated with the plurality of platforms in the database, the database maintained in a single location and storing the IT operational data for the plurality of IT management software products in the single location, each piece of IT management software using the single integrated database schema that is common to the plurality of IT management software products associated with the plurality of platforms; and access the database via the single integrated database schema that is common to the plurality of IT management software products associated with the plurality of platforms.

* * * * *